J. DENGEL.
DRAG ATTACHMENT FOR PLOWS.
APPLICATION FILED NOV. 29, 1909.
987,286.
Patented Mar. 21, 1911.
2 SHEETS—SHEET 1.
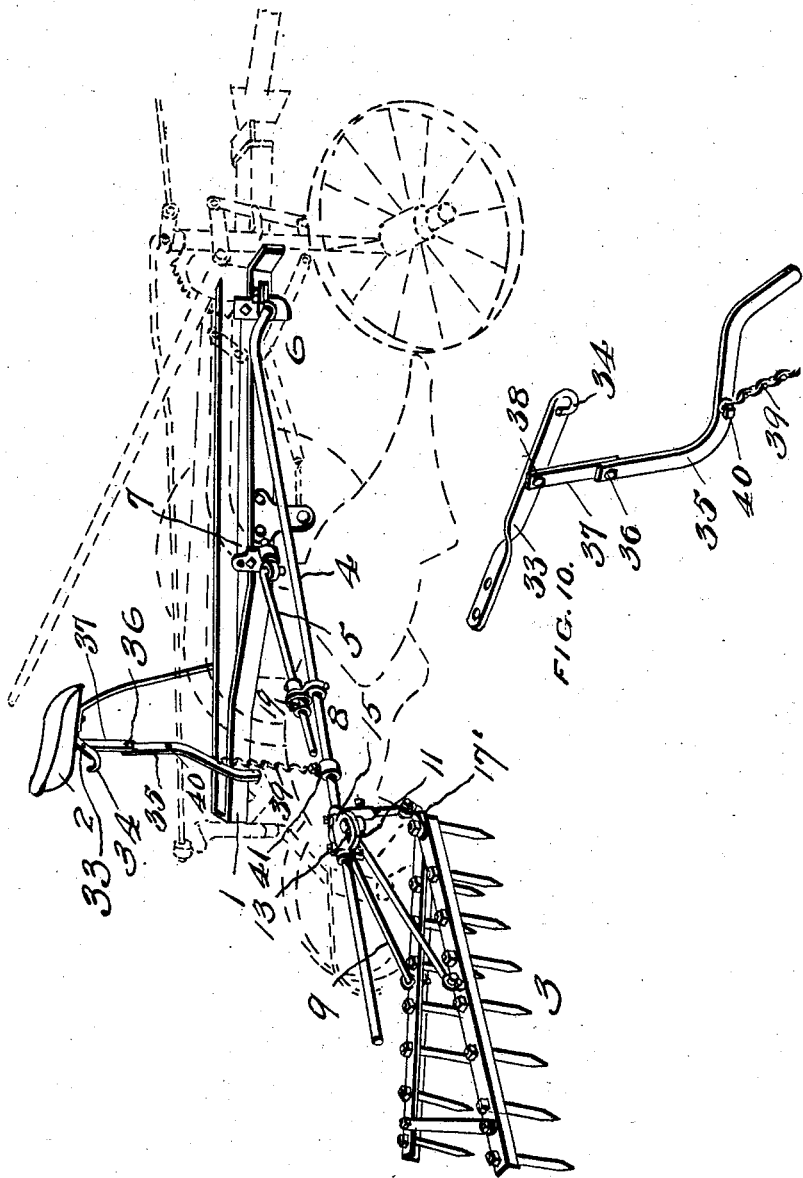
WITNESSES
C. K. Davies
J. L. Miller
INVENTOR
John Dengel
By William O. Wright
Attorney J. DENGEL.
DRAG ATTACHMENT FOR PLOWS.
APPLICATION FILED NOV. 29, 1909.
987,286.
Patented Mar. 21, 1911.
2 SHEETS—SHEET 2.
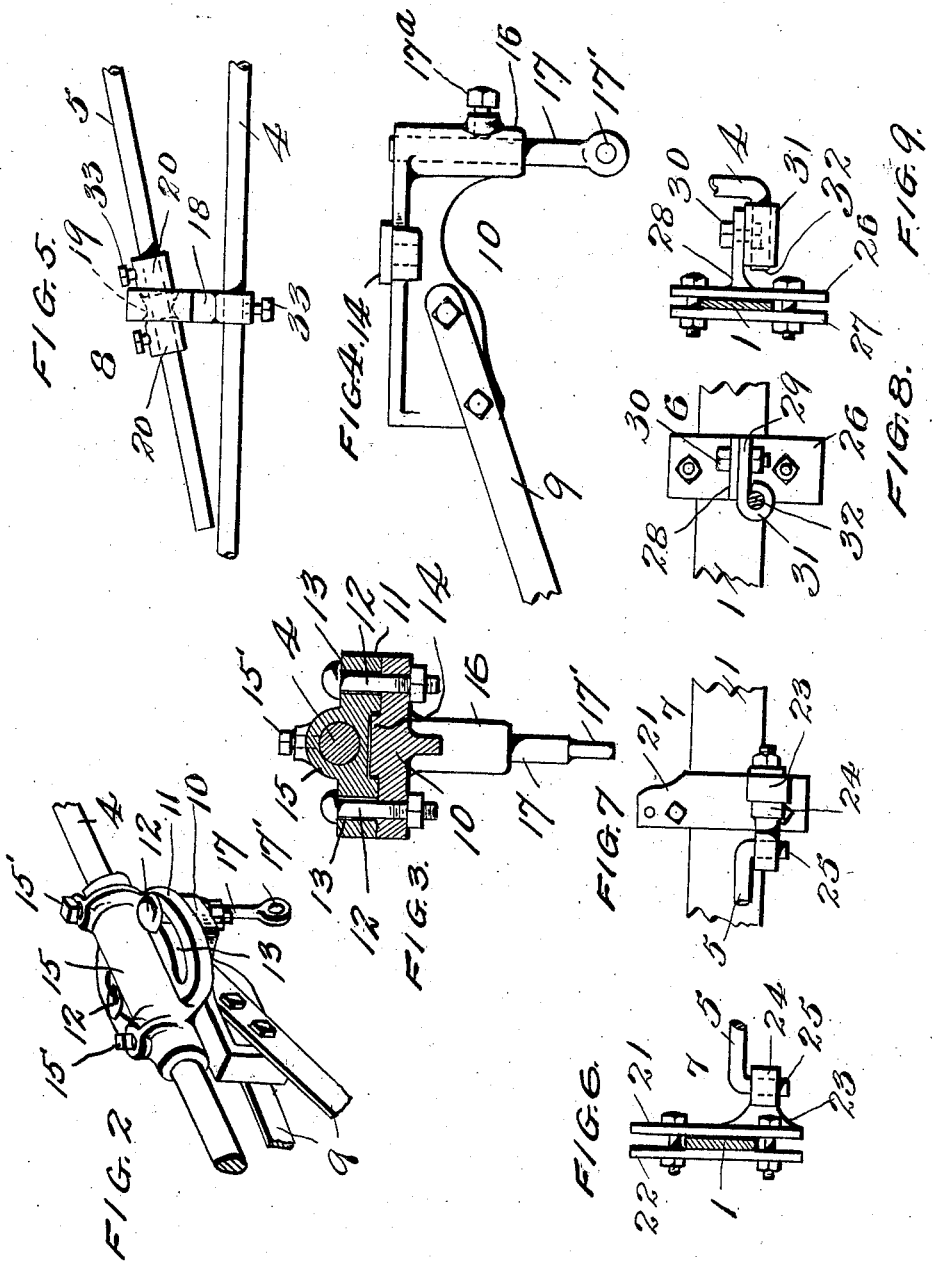
WITNESSES
Chas. K. Davies
J. L. Miller
INVENTOR
John Dengel
By William W. Wright
Attorney

UNITED STATES PATENT OFFICE.

JOHN DENGEL, OF MADISON, WISCONSIN, ASSIGNOR TO AMERICAN PLOW CO., OF MADISON, WISCONSIN.

DRAG ATTACHMENT FOR PLOWS.

987,286.  Specification of Letters Patent.  Patented Mar. 21, 1911.

Application filed November 29, 1909. Serial No. 530,419.

*To all whom it may concern:*

Be it known that I, JOHN DENGEL, machinist, a citizen of the United States, residing at Madison, in the county of Dane and State of Wisconsin, have invented new and useful Improvements in Drag Attachments for Plows, of which the following is a specification.

The present invention relates to improvements in drag attachments for plows, and is especially applicable to the class of riding plows.

The object of the invention is the provision of means for removing a drag, which may be a toothed harrow, rotary device, or other implement, from operative position, when used in conjunction with a riding plow. The devices by means of which this result is accomplished, are adapted to swing the drag attachment toward the seat of the machine and the entire weight of the drag attachment is carried over directly against the frame of the plow. When in this position the weight of the drag is centrally disposed with relation to the frame of the plow, and tipping of the plow, by reason of the weight of the drag, is thus eliminated.

To this end the invention consists in certain novel features of construction and combinations and arrangements of parts of the means for connecting the drag with the plow as will be hereinafter more fully described and pointed out in the claims.

In the accompanying drawings, I have illustrated one example of the physical embodiment of my invention, constructed according to the best of the several modes I have so far devised for the practical application of the principles.

Figure 1 is a perspective view of a riding plow shown in dotted lines, the device embodying the features of my invention, a harrow, and parts of the plow frame, being illustrated in full lines. Fig. 2 is a perspective view, enlarged, showing the device for connecting the drag attachment with frame of the device. Fig. 3 is a transverse section of Fig. 2. Fig. 4 is a side view of part of Fig. 3. Fig. 5 is a detail view of the joint between parts of the attachment. Fig. 6 shows a part of the plow frame in section and one of the operating parts of the attachment secured thereto. Fig. 7 is a face view of Fig. 6. Fig. 8 shows another operating part of the attachment secured to the plow frame. Fig. 9 shows the frame bar in section, with the device of Fig. 8 attached thereto, and Fig. 10 is a rear perspective view of the implement lifting device.

In the drawings I have illustrated in full lines so much of the plow frame as is necessary for a proper understanding of the invention, the main frame 1 and seat 2 being essential for the attachment and operation of the device. In this instance I have illustrated the drag as a toothed harrow 3, but it will be understood that a rotary or other implement may be utilized with equal facility in this connection.

The novel attaching means comprises essentially the two rods or bars 4 and 5, which are pivoted with universal joints 6 and 7, respectively, to the frame of the plow, loosely connected to each other at 8, and flexibly connected to the harrow by means of the braces 9. The braces 9 are coupled with the harrow frame at one end and their other ends are fixed to the rotary member 10, upon which the plate 11 of the coupling is imposed. This coupling admits of a wide range of adjustments and its construction enables the operator to use the harrow attachment at either the right or left side of the plow.

The plates 10 and 11 are held together by bolts 12 which are passed through circular slots 13 in the plate 11 and secured at the under side of plate 10 by nuts. A central base 14 on plate 10 projects into a complementary recess in the upper plate and forms a bearing for the rotary movement of the lower plate. The plate 11 is cast with an integral sleeve 15 having a bore to permit the passage of bar 4 and is provided with set screws 15′ for adjustably securing the coupling on the bar. A hollow depending shank 16 is cast on the lower plate 10 for the reception of the bolt 17 which is coupled to the harrow frame at 17′ and may be adjusted vertically by screw 17ᵃ. The two bars 4 and 5 are connected together by means of the bracket 18 which is rigidly secured to the bar 4 and is provided with an enlarged opening 19 through which the bar 5 is passed. Collars 20 are secured at each side of the opening in the bracket, and the opening 19 is of such diameter as to permit a slight play of the bar 5 therethrough, but prevents the passage of either collar 20.

Figs. 6, 7, 8 and 9 illustrate more comprehensively the pivoted connection between the attachment and the frame of the plow. Referring to Figs. 6 and 7 more especially, it will be seen that the bracket 21 which is clamped by means of the plate 22 and suitable nuts and bolts, to the plow frame, is formed with a perforated lug 23 for the reception of the eyebolt 24, and through the eye of the bolt 24 the bent end 25 of the bar 5 is passed. Thus are provided two pivot motions, the vertical motion or turn of the eye bolt in the lug 23, and the horizontal turning of the bent end 25 in the eye of the bolt 24. A similar double pivotal motion is accomplished by means of the construction shown in Figs. 8 and 9. The bracket 26 is clamped to the frame bar by plate 27 and accompanying bolts and nuts. This bracket 26 is formed with a laterally projecting perforated ear 28, to which is pivoted the turn plate 29 by means of the bolt 30. A sleeve 31 is formed by curling the end of said plate, and in this sleeve the end 32 of the bar 4 is journaled. By this arrangement of parts the plate 29 is permitted to turn in a horizontal plane and the end 32 of bar 4 may turn in a vertical plane. Thus the pivot 30 allows one possible motion, the pivot 32 a second motion, and the pivots 24 and 25, make possible the motion of the other parts. To adjust the distance and direction of the drag, the parts of the implement may be moved to their determined positions, and secured in place by set screws 15'. At the underside of the seat 2, a twisted metallic strap 33 is secured by bolts or other suitable means, and said strap is fashioned at its free end with a hook 34 to receive and hold the lever arm 35. This lever 35 is pivoted at 36 to one end of a floating lever bar 37, which is pivotally suspended at 38 from the rigid supporting strap 33. A draw chain 39 is attached at 40 to the lever arm and its other end is secured to a sleeve or collar 41, longitudinally movable to adjusted position on the bar 4.

The lifting device in Figs. 1 and 10 is illustrated in the position assumed when the drag is in operative or working position. To lift the attached implement, the free end of the lever arm is raised. The lever swings on its pivotal connections 36 and 38, until it is carried over sufficiently to fall behind and rest in the hook 34 of strap 33. By means of the lever connections and chain the drag and attachments may be lifted out of operative or working position, and the bars 4 and 5 are so arranged that because of their pivots, the dragging implement, instead of being raised vertically in the air, swings over against the seat and frame of the plow, and in this position the weight of the drag and attachment is supported against the frame instead of being suspended at one side thereof, as is the case with many implements now in use. The swinging over, against the frame, of the implement tends to preserve the equilibrium of the plow frame while in use, and thus eliminates a serious objection, as tipping of the plow invariably occurs when using a device which merely lifts the drag vertically from its operative position.

From the above description taken in connection with the drawings it is evident that I have produced an attachment which fulfils the purposes set forth, and the invention, as thus embodied and used has proved highly efficient and satisfactory.

Having thus fully described my invention, what I claim as new and desire to secure by Letters Patent is:—

1. The combination with a plow frame of a pair of bars independently and loosely connected thereto to permit swinging the bars over toward the frame, an adjustable sleeve on one of the bars, and a link loosely connecting said sleeve with the other bar.

2. The combination with a plow frame and a drag attachment, of a pair of bars loosely connected to the frame by universal joints, an adjustable connection between one of said bars and the drag attachment, an adjustable coupling between said bars, and means for swinging said attachment upward and over toward the plow frame.

3. The combination with a plow frame and a drag attachment, of a pair of bars and an adjustable coupling device connecting them, an eye bolt loosely held in the frame and having the bent end of a bar journaled therein, a sleeve attached to the frame and the bent end of the second bar journaled therein, and means for swinging the bars and drag attachment upwardly and over toward the plow frame.

4. The combination with a plow frame and a harrow, of a pair of bars loosely connected together, a revoluble eyebolt supported on the frame and having the bent end of one of said bars journaled therein, and the other bar pivotally connected to the frame, a draft attachment connecting one of said bars and harrow, and means for swinging said harrow upward and over toward the frame.

5. The combination with a plow frame, of a pair of bars and an adjustable coupling device connecting them, an eye bolt loosely held in the frame and having the bent end of a bar journaled therein, a sleeve attached to the frame and the bent end of the second bar journaled therein, a drag attachment adjustably connected to one of said bars, and means for swinging the bars and attachment upwardly and over toward the plow frame.

In testimony whereof I have hereunto set my hand in presence of two subscribing witnesses.

JOHN DENGEL.

Witnesses:
F. G. FINDLEY,
W. B. ESSER.

Copies of this patent may be obtained for five cents each, by addressing the "Commissioner of Patents Washington, D. C."